US006073838A

United States Patent [19]

Baitz et al.

[11] Patent Number: 6,073,838

[45] Date of Patent: Jun. 13, 2000

[54] CASH REGISTERS HAVING MOVABLE FRONT COVERS

[75] Inventors: Günter Baitz; Hartmut Kamin, both of Berlin, Germany

[73] Assignee: Siemens Nixdorf Informationssysteme AG, Paderborn, Germany

[21] Appl. No.: 09/011,463

[22] PCT Filed: Feb. 22, 1996

[86] PCT No.: PCT/DE96/00278

§ 371 Date: Jan. 9, 1998

§ 102(e) Date: Jan. 9, 1998

[87] PCT Pub. No.: WO97/06517

PCT Pub. Date: Feb. 20, 1997

[30] Foreign Application Priority Data

Aug. 10, 1995 [DE] Germany .......................... 195 29 513

[51] Int. Cl.[7] ........................... G06K 3/00; G06K 17/00

[52] U.S. Cl. ......................... 235/380; 235/375; 235/382; 902/22; 902/26

[58] Field of Search ....................... 902/22, 20; 235/375, 235/382, 380

[56] References Cited

U.S. PATENT DOCUMENTS

| | | | |
|---|---|---|---|
| 3,597,734 | 8/1971 | Harrie | 340/149 |
| 4,395,626 | 7/1983 | Barker et al. | 235/381 |
| 4,629,871 | 12/1986 | Scribner et al. | 235/375 |
| 4,658,421 | 4/1987 | Bohannon | 379/422 |
| 4,678,896 | 7/1987 | Carlson et al. | 235/380 |
| 4,790,504 | 12/1988 | Wills et al. | 248/183 |
| 4,841,412 | 6/1989 | Heys, Jr. et al. | 361/393 |
| 4,903,221 | 2/1990 | Krenz | 364/708 |
| 5,302,811 | 4/1994 | Fukatsu | 235/381 |
| 5,495,733 | 3/1996 | Yen et al. | 70/279 |
| 5,543,787 | 8/1996 | Karidis et al. | 341/20 |
| 5,625,669 | 4/1997 | McGregor et al. | 379/58 |
| 5,659,307 | 8/1997 | Karidis et al. | 341/22 |
| 5,825,617 | 10/1998 | Kochis et al. | 361/686 |
| 5,841,630 | 11/1998 | Seto et al. | 361/683 |
| 5,844,219 | 12/1998 | Wallner | 235/380 |
| 5,883,859 | 3/1999 | Bentley | 368/10 |
| 5,884,745 | 3/1999 | Kalis et al. | 194/217 |

FOREIGN PATENT DOCUMENTS

| | | |
|---|---|---|
| 0 085 482 | 8/1983 | European Pat. Off. . |
| 2 407 518 | 5/1979 | France . |
| 37 41 704 | 6/1989 | Germany . |
| WO 79/00514 | 8/1979 | WIPO . |
| WO 90/00304 | 1/1990 | WIPO . |

OTHER PUBLICATIONS

IBM Technical Disclosure Bulletin, "Keyboard Support Lifting Assembly with Locking Feature", Nov. 1985, US, vol. 28, pp. 2361–2363.

*Primary Examiner*—Thien M. Le
*Assistant Examiner*—Douglas X. Rodriguez
*Attorney, Agent, or Firm*—Hill & Simpson

[57] ABSTRACT

The present invention provides new cash registers which are suitable for use in catering companies and retail businesses. The cash registers can be easily adapted to the ergonomic requirements of a standing or seated operator. Various devices can optionally be installed in a wall located underneath a keypad surface and are covered by a front region of the keypad surface. The keypad surface can pivot to allow access to the various devices.

14 Claims, 5 Drawing Sheets

CASH REGISTERS HAVING MOVABLE FRONT COVERS

Figure 1:
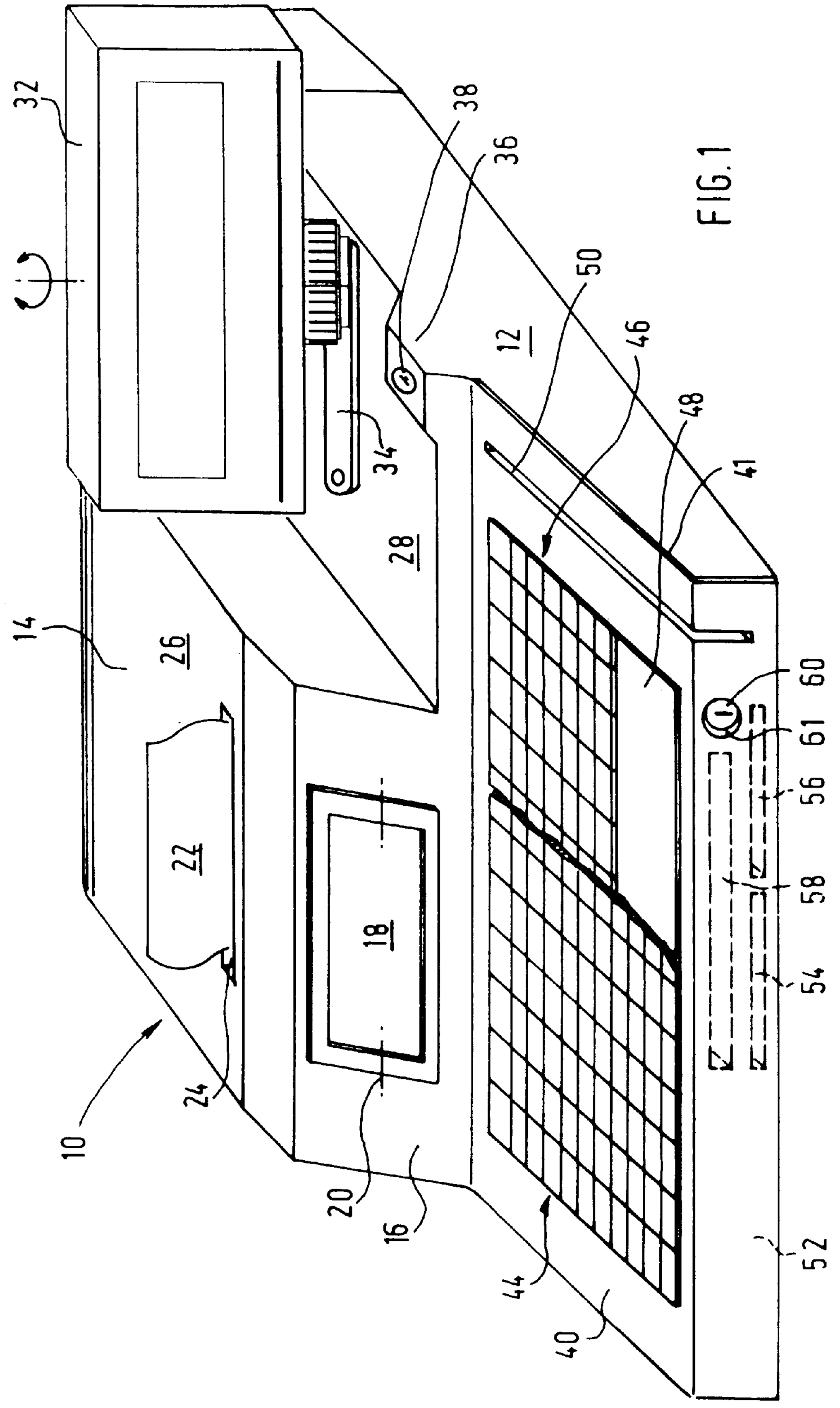

The invention relates to a cash register for use in catering companies and retail businesses.

Depending on the particular use, different requirements are made of cash registers in terms of the way in which they can be operated. For example, cash registers in catering companies, so-called bar cash registers, are operated by a standing person, as it were in passing, while the cashier in a retail business is seated in front of the cash register during the entire working time. This results in different ergonomic design principles which are to a certain extent contradictory and which have hitherto been fulfilled only imperfectly with a single design of cash register.

The desire for application-specific equipment relates to different storage and identification media such as disk drives for diskettes or CD-ROM, connection possibilities for electronic, electro-optical or electromechanical mass storage devices, for example, according to the PCMCIA Standard or even readers for magnetic strip cards or smartcards with which a cashier is identified at the cash register. The casing of the cash register would have to be changed for each equipment variant. However, different designs make a cash register more expensive.

It is already known to make cash register systems of modular design. The individual components, and thus a selection of different keypads, are accommodated in discrete casings. When such a cash register system is installed, the individual components are to be electrically connected to one another, which generally requires the use of a technician. However, this runs counter to efforts to hand over directly to a user of the cash register a system which is ready for operation when installed.

WO-A-97/00514 discloses a cash register with a control region, comprising a console shaped keypad surface, and a display region, the keypad surface of which cash register is mounted on the lower part of the cash register so as to be pivotable about a pivot axis running parallel with its rear edge, and in its folded down position can be locked to the said lower part. The front region of the keypad surface is bent downward.

In its folded down position, the keypad surface covers a money container with a plurality of compartments arranged next to and behind one another, the height of their front walls decreasing incrementally in the direction of the front wall in the cash register. The front wall of the cash register drops away abruptly in a rearward and downward direction in relation to the side walls. When the keypad surface is folded down, this abruptly set back region is closed off by the front, downwardly bent region of the said keypad surface, the lower edge of which region then rests on the upper edge of the front wall.

DE-A 37 41 704 discloses a card reader installed in the front wall of a cash register.

IBM TECHNICAL DISCLOSURE BULLETIN, Vol. 28, No. 6, Nov. 1985, pages 2361–2363, discloses how a pivotable keypad can be releasably held on a computer casing with a bolt which is acted on by spring force.

EP-A-0 085 482 describes various possible ways of alternately or simultaneously making accessible, or inaccessible, to a user two keypads which are accommodated in separate casings. According to a first proposed solution, both keypads are located one on top of the other, so that only the upper one can be used. The latter can be pushed rearward, as a result of which the lower keypad also becomes accessible. According to a second proposal, a lower keypad can be pulled forward from under an upper one, so that both keypads can be used at the same time. According to a third proposal, an upper keypad can be pivoted, with its rear upper edge, on the front upper edge of a lower keypad. In order to make the first keypad accessible, it is pivoted forward in front of the lower keypad.

U.S. Pat. No. 4,790,504 describes a screen support device on which a display device is mounted so as to be capable of being inclined and rotated about a vertical axis.

The object of the invention is to propose a compact cash register which can be adapted to different conditions of use by means of simple measures.

The object is achieved by means of the features of claim 1.

The optional equipment possibility with different keypads or else with a combined display/input device not only permits an application-specific design of a cash register but also makes it possible to be retrofitted easily at a later date if a change to the application or new input devices make this necessary. For example, the use of a flat screen with a so-called touch screen or a pen computer surface or with soft keys opens up new application possibilities in the field of self-service.

Similar possibilities are obtained for storage means which only have to be operated intermittently, for example diskette disk drives for loading programs, CD-ROM disk drives for operating an optical PLU memory, smartcard readers for logging onto the cash register, mass storage devices according to the PCMCIA Standard for electronic journals etc. To install such devices, it is necessary to provide in each case an opening in the casing of the cash register, non-occupied openings having to be sealed off for security reasons. Covering over these openings with the downwardly bent region of the keypad surface fulfils this requirement. At the same time, nonauthorized persons are denied access to the aforesaid devices.

Figure 2:
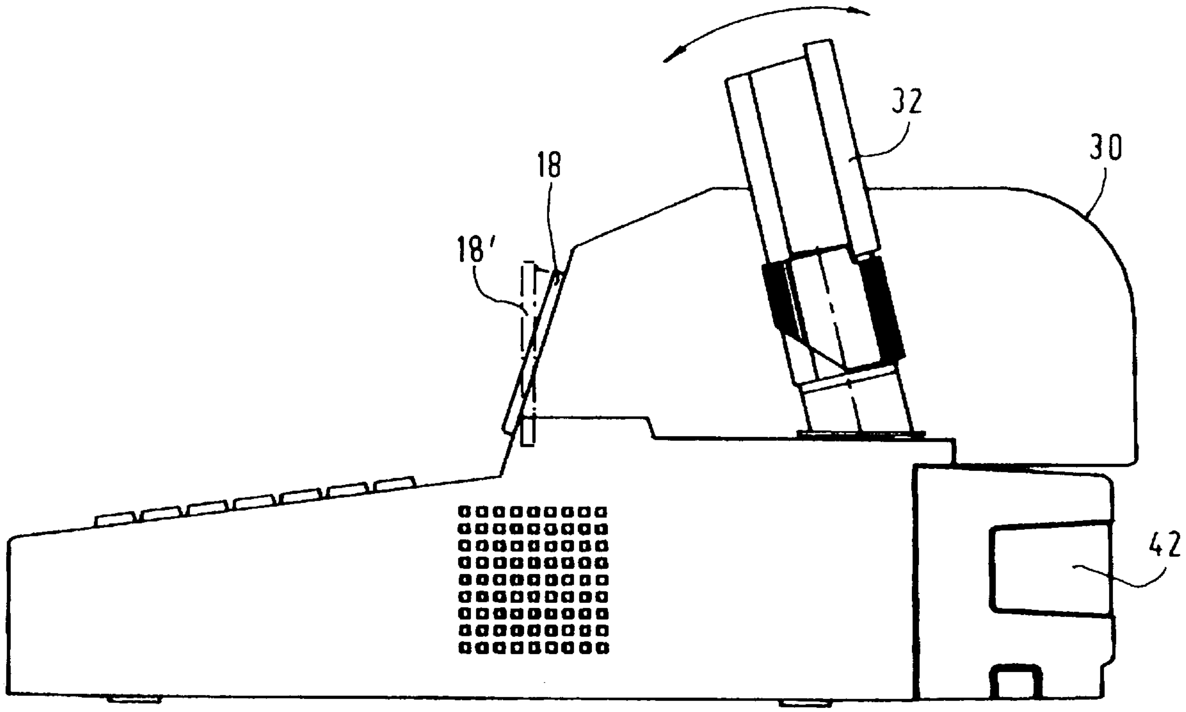
Figure 3:
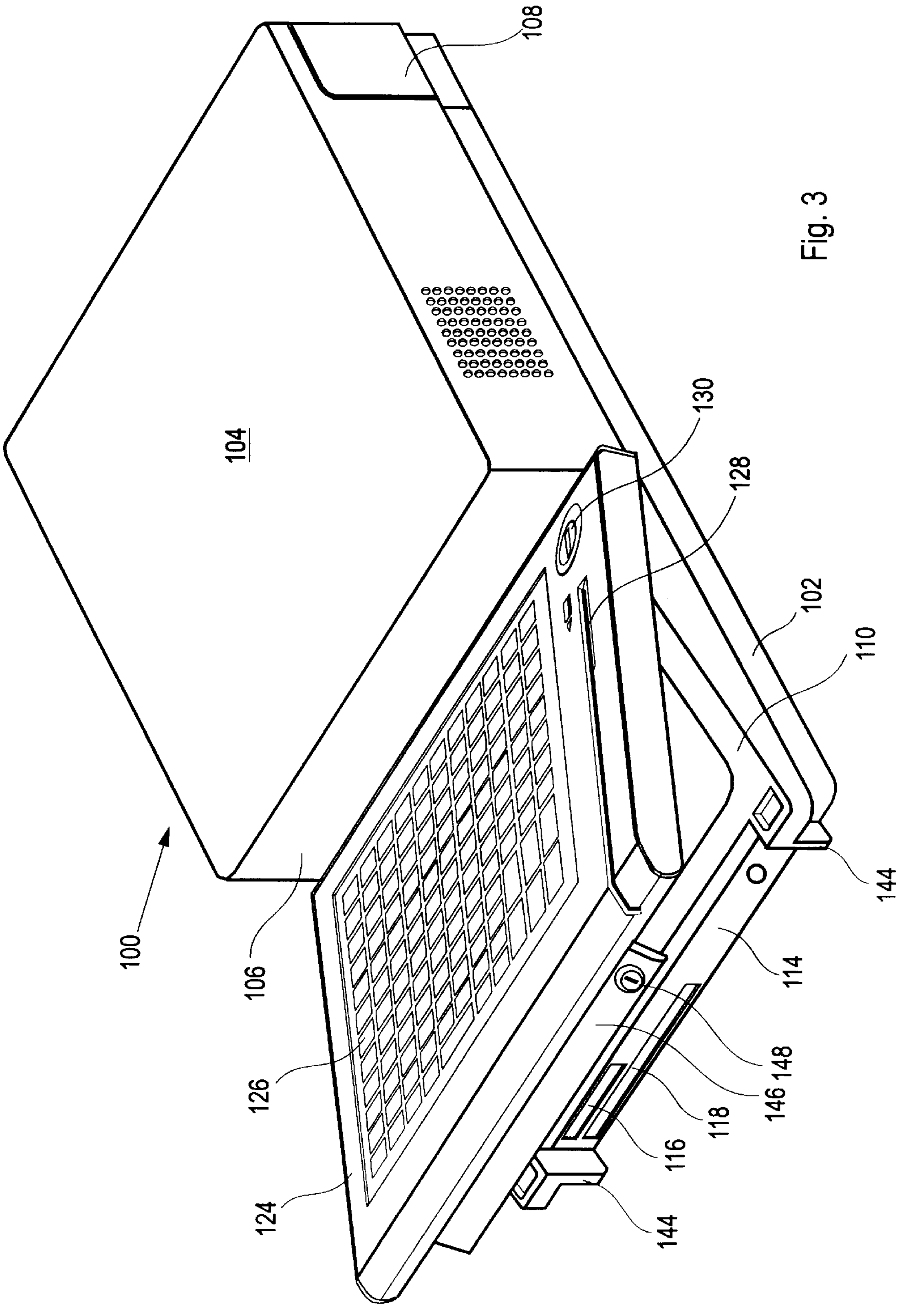
Figure 4:
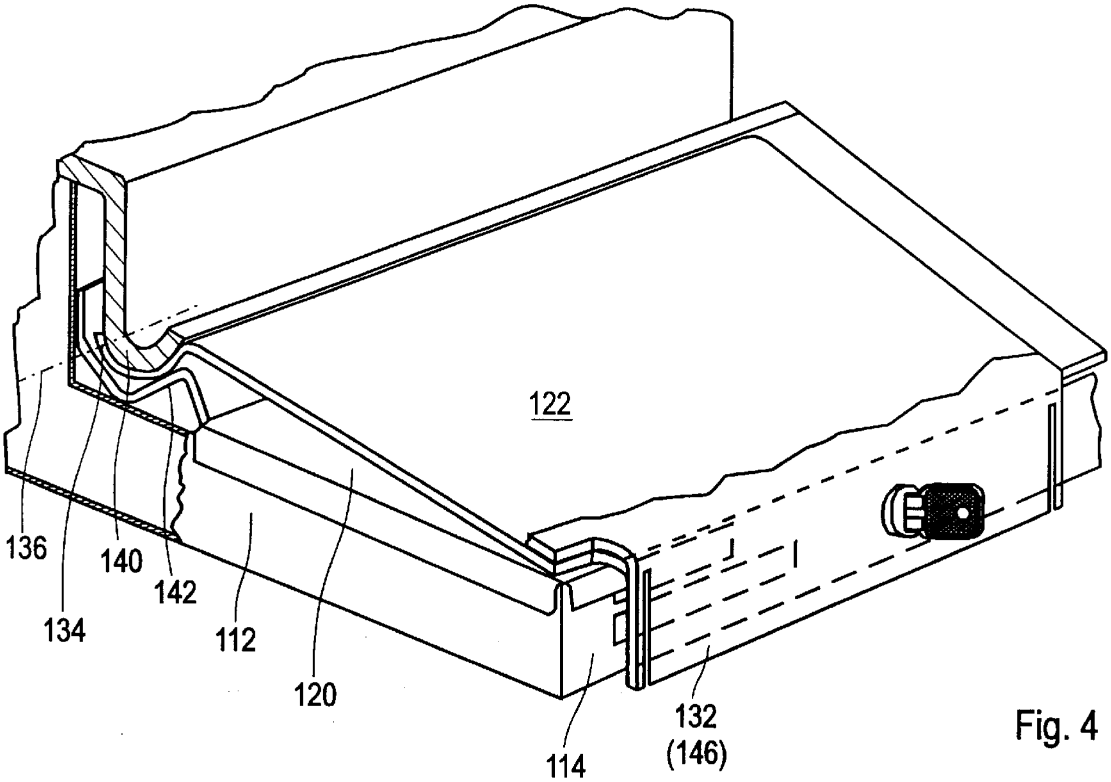
Figure 5:
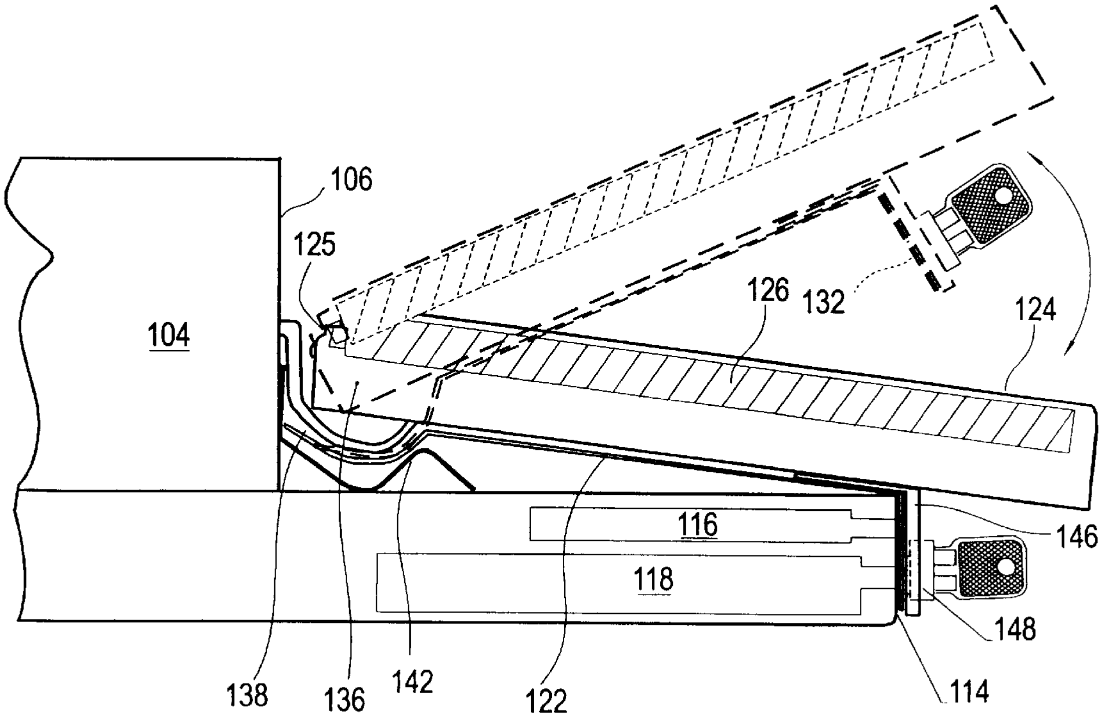
Figure 6:
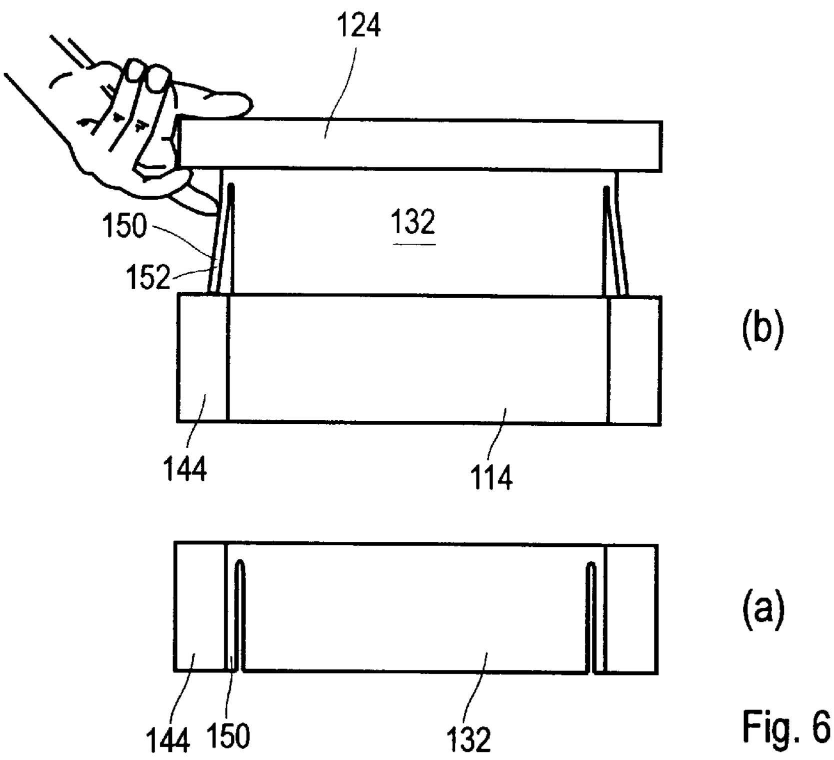
Figure 7:
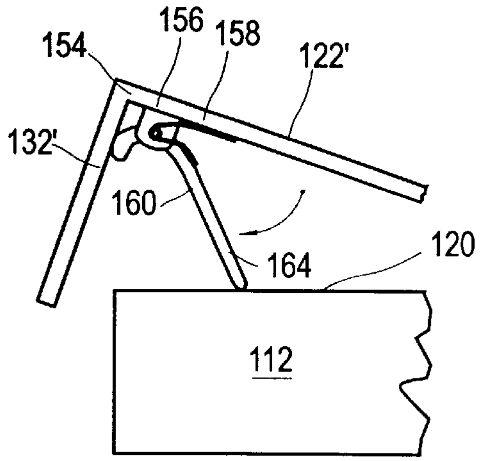
Figure 7:
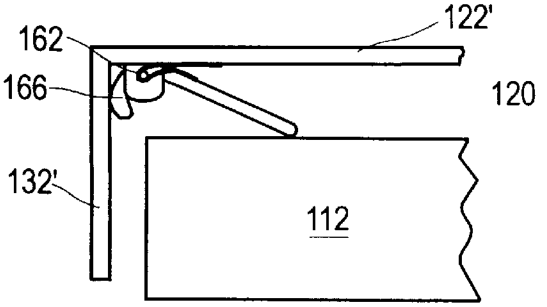
Figure 8:
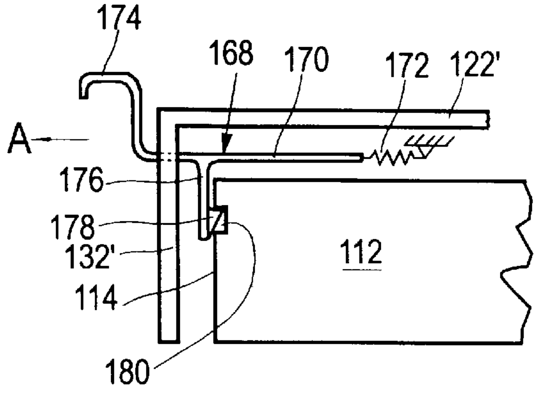

The invention is described below with reference to exemplary embodiments illustrated in the drawing, in which FIG. 1 shows a first exemplary embodiment of a cash register according to the invention in a perspective front view, FIG. 2 shows the cash register from FIG. 1 in a side view, FIG. 3 shows a second exemplary embodiment of a cash register according to the invention in a perspective front view, FIG. 4 shows the cash register from FIG. 3 without a keypad in a sectional, perspective partial view, FIG. 5 shows the cash register shown in FIG. 3, with the keypad in two positions in a schematic side view, FIG. 6 shows a first exemplary embodiment of a supporting device for a keypad surface in a front view, (a) in a folded down position and (b) in a pivoted up position, FIG. 7 shows a second exemplary embodiment of a supporting device for a keypad surface in a sectional side view, (a) in a folded down position and (b) in a pivoted up position, FIG. 8 shows a locking device for a keypad surface in a schematic side view.

FIG. 1 illustrates a first exemplary embodiment of a cash register 10 in a perspective front view. The latter comprises a flat lower part 12 with a raised upper portion 14 in the rear left-hand region. The front wall 16 of the upper portion 14 is inclined rearwards at an angle of approximately 18° with respect to the surface normal of the installation surface. An operator display device 18 which can be pivoted about a horizontal axis 20 is installed in it.

In the upper portion 14 there is a printer (not illustrated) at least for receipts 22, which are transported out of the upper portion 14 through a receipt outlet 24 on the upper side 26. There is space for a receipt roll in the rear part of the upper portion. In order to keep the blind viewing angle of the operator with regard to the part of the installation surface behind the cash register 10 as small as possible, the rear region of the upper portion is provided with a rounded portion 30, matching the contour of the receipt roll (FIG. 2). The upper portion 14 projects rearward beyond the lower part 12. The space below the overhang is taken up by a cable cover 42 which can be removed from the lower part 12 for installation and maintenance purposes.

The part 28 of the rear cover surface of the lower part 12 which is located next to the upper portion 14 extends essentially horizontally. Attached to it is a customer display device 32, with adjustable angle of inclination and height, on a pivotable extension arm 34. Furthermore, on the cover surface 28 on the right at the front in the figure there is an elevation 36 with a central lock 38 for the cash register 10.

The front region 40 of the lower part 12 drops away gently toward the front at an angle of approximately 8° with respect to the installation surface. The front region 40 is covered by a keypad surface 41 which can be equipped with keypads appropriate to the particular application: In the left-hand part, a so-called barman's keypad 44 is symbolically illustrated. This has a large number of keys, 132 in the exemplary embodiment. It essentially utilizes the entire available surface of the front region 40. In the right-hand part, a so-called checkout keypad 46, as is customary on cash registers in retail businesses, is symbolically illustrated. It has a smaller number of keys which are arranged in a small number of rows, so that a handrest 48 can be arranged in the front region in front of the keypad without extending the lower part 12 forward.

On the right next to the keypad 44 or 46, a magnetic card reader 50 is installed in the front region 40, and a smartcard reader 54, an operator identification reader 56, a diskette drive 58 and an operator lock 60 are installed in the vertical front wall 52 of the lower part 12. The said operator lock 60 is always accessible through an opening 61 in the keypad surface 41. The selection of the peripherals to be installed in the front wall 52 is at the discretion of the user, so that it is also possible to provide card receptacles according to the PCMCIA Standard.

Arranged under the keypad 44, 46 is a keypad controller which is used to control the keypad itself as well as the magnetic card reader 50 and the operator lock 60. Installed in the rear region of the lower part 12 under the upper portion 14 and the horizontal cover surface 28 are a mains component and the electronic cards, known for example from a PC, which are necessary to control a cash register. The connection plugs of the electronic cards project rearwards out of the lower part 12 and are accessible after the cable cover 42 has been removed.

If the cash register is to be used as a barman's cash register, a handrest is not required. A handrest can thus be dispensed with without a disadvantage for the user. The space is consequently available for additional keys. The operator display is moved into the rearwardly inclined position, which is illustrated in FIG. 2 by unbroken lines and designated by 18, so that it can be easily read by a standing person.

If the cash register is used as a checkout cash register, fewer keys are necessary, and the cashier has a handrest available. The operator display is in this case expediently moved into the position 18' illustrated in FIG. 2 by dot-dash lines, and can be conveniently read by a seated person.

FIG. 3 illustrates a second exemplary embodiment of a cash register 100 in a perspective front view. The said cash register 100 comprises a flat lower part 102 with a raised upper portion 104. The front wall 106 of the upper portion 104 is only schematically illustrated. It may be inclined in accordance with the front wall 16 of the cash register 10 and equipped with an operator display device. A cable cover 108 is provided in the rear region.

The front region 110 of the lower part 102 of the cash register casing drops away obliquely toward the front. The said front region 110 surrounds a casing 112 (FIG. 4) made of metal in whose front wall 114, which drops away perpendicularly, a smartcard reader 116 and a diskette drive 118 are installed. The upper side of the casing 112 forms a cover panel 120 over which a keypad surface 122, which is likewise produced from sheet metal, is pivotably arranged. Attached to the said keypad surface 122 is a keypad casing 124 in which a keypad 126, a swipe-through magnetic card reader 128 and an operator lock 130 are accommodated.

A front region 132, projecting beyond the casing 112, of the keypad surface 122 is bent downward, so that it comes to rest in front of the front wall 144 of the casing 112 and completely covers it. The rear region of the keypad surface 122 is bent downward to form a throat 134 which runs over its entire width and has a circular segment-shaped cross section. The centre line of the throat 132 coincides with a pivot axis 136 about which the keypad surface 122 can be pivoted. The throat 134 extends in a gap 138 between the cover panel 120 and a rib 140 which is formed onto the upper portion 104 and whose contact surface with the keypad surface 122 is matched to the circular segment shape of the throat 134. The cover panel 120 may be planar in the contact region of the throat 134. However, an even better guidance of the pivoting movement of the keypad surface 122 about the pivot axis 136 is obtained if the cover panel 120 is in a wave 142 shape in this region (FIGS. 4 and 5). The throat 134 is in the trough of a wave in this case.

Between the keypad surface 122 and the cover panel 120 there is, in every pivot position, electrical contact over a large surface so that the connection of the keypad surface 122 to the earth potential of the casing 122 is always ensured.

FIG. 5 shows the keypad surface 122 together with the keypad casing 124, attached thereto, in a folded down position (illustrated with unbroken lines), and a pivoted up position (illustrated with broken lines). In the first-mentioned position, the front region 132 of the keypad surface 122 covers the front wall 114 and thus prevents access to the smartcard reader 116 installed therein, and to the diskette drive 118. In addition, FIG. 5 shows that the pivot axis 136 of the keypad surface 122 is positioned so far ahead of the front wall 106 of the upper portion 104 that the rear edge 125 of the keypad casing 124 does not collide, in any position, with the front wall 106 or with elements installed therein.

The front region 132 of the keypad surface 122, which is folded down, is located between projections 144 which are formed onto the front of the lower part 102 (FIG. 3). A cover panel 146 (FIG. 5), which is fitted onto the front region 132, is flush at the front with the projections 144 so that a cash register casing without disruptive projections is obtained. A lock 148 which also penetrates the front region 132 of the keypad surface 122 is installed in the cover panel 146, with which lock 148 the keypad surface 122 can be locked together with the front wall 114. Unauthorized access to the smartcard reader 116 or to the diskette drive 118 can thus be reliably prevented.

FIGS. 6 and 7 show two different exemplary embodiments of a supporting device for the keyboard surface 122.

On the one hand, these hold the keyboard surface 122 in its pivoted up position, so that equipment—in the exemplary embodiment according to FIG. 3 this is the smartcard reader 116 and the diskette drive 118—which is installed in the front wall 114 of the casing 112 can be conveniently operated. On the other hand, when the keyboard surface 122 is folded down, it is prevented from striking hard against the casing 112, which could lead to a magnetic disk drive which is likewise installed in the casing 112 being destroyed.

FIG. 6 shows a first exemplary embodiment of a supporting device for the keypad surface 122 (a) in the folded down position and (b) in the pivoted up position. Formed onto the side edges of the front, bent region 132 of the keypad surface 122 is in each case a support 150 which protrudes obliquely to the side at an angle of approximately 10° in each case. When the keypad surface 122 is folded up, its lower end 152 rests on the adjacent projection 144. In order to fold down the keypad surface 122, the operator has to grasp with both hands (illustrated in FIG. 6*b* for one side) the keypad casing 124 which is attached thereto, and has to press the supports 150 towards one another with a free finger until the said supports 150 are aligned parallel with the adjacent projection 144. Then, the keypad surface 122 can be moved downward. During pivoting down, the supports 150 slide along the projections 140 with an increased frictional resistance, which comes about under the action of an elastic restoring force of the laterally bent support. As a result, a low-shock transition of the keypad surface 122 from the pivoted up position into the folded down position (FIG. 6*a*) is ensured.

FIG. 7 shows a second exemplary embodiment of a support device for a keypad surface 122' (a) in a folded down position and (b) in a pivoted up position. Formed onto the side, facing the casing 112, of the keypad surface 122' is, on the right and on the left, a clip 156 in the vicinity of the bending edge 154 about which the front region 132' of the keypad surface 122' is bent downward. A two-armed supporting lever 160, on which the force of a leg spring 158 acts in the direction of the casing 112 and which can be pivoted about an axis 162 which is aligned parallel with the pivot axis 136 of the keypad surface 122', is mounted on each of these said clips 156. A first limb 164 of the supporting lever 160 rests on the cover panel 120 of the casing 112, and the second limb 166 is bent downward. The limbs 164, 166 enclose an angle of approximately 60°.

In its folded down position (FIG. 7*a*), the keyboard surface 122' is held by a locking element 168 (FIG. 8), which is described below. When this locking element is released, the support lever 160 rights itself under the driving force of the leg spring 158 and, in doing so, moves the keypad surface 122' into its pivoted up position (FIG. 7*b*) without the said keypad surface 122' having to be raised manually. In this position, the second limb 166 rests on the front region 132' of the keypad surface 122' and thus delimits the pivoting range of the support lever 160. To fold it down, the keypad surface 122' is pressed downward manually. In this process, the lower end of the first support lever limb 164 slides along on the cover panel 120 while the leg spring 158 is simultaneously stressed. This arrangement also ensures, like the exemplary embodiment of the support device according to FIG. 6, that there is a low-shock transition of the keypad surface 122' from the pivoted up position into the folded down position (FIG. 7*a*). Moreover, it has the advantage that it can be operated with one hand.

FIG. 8 shows the locking element 168 for the keypad surface 122' in a sectional side view. On the side of the keypad surface 122' facing the casing 112, the said locking element 168 contains a longitudinally displaceable slide 170 which is aligned parallel with the said keypad surface 122'. The slide 170 penetrates the front region 132' of the keypad surface 122' where it is provided with a handle 174. On the inside of the front region 132', a downwardly pointing tongue 176, on whose lower end a hook-shaped catch projection 178 is constructed, is formed onto the slide 170. The said catch projection engages, in its locking position, in a catch recess 180 in the front wall 114 of the casing 112. An adjustment force, in the direction of the casing 112, of a tensioning spring 172 acts on the slide 170. In order to unlock it, the slide 170 is moved in the direction of the arrow A. The catch projection 178 disengages from the catch recess 180 and the keypad surface can swing upward.

We claim:

1. A cash register for use in catering companies and retail businesses, the cash register comprising:

a control region with a console shaped keypad surface and a display region, the keypad surface being mounted on a lower part of the cash register and pivotable about a pivot axis along a rear edge, and a front region of the keypad surface being bent downward, the keypad surface being pivotable between a raised position and a lowered position;

a keypad casing equipped with a keypad attached to the keypad surface;

a vertical front wall of a casing located underneath the keypad surface adapted to install at least one of a smartcard reader, a diskette drive, a disk drive for optical storage media, an operator lock and a—PCMCIA Standard card receptacle; and a support device carried on the cash register which holds the keypad surface in the raised position which clears the vertical front wall and, in the lowered position covers the vertical front wall and prevents the keyboard surface from striking hard against the casing.

2. The cash register as claimed in claim 1, in which, when the keypad surface (122) is folded down, the front, downwardly bent region (132) lies between projections (144) which laterally delimit the front wall (114).

3. The cash register as claimed in claim 2, in which arranged on one side edge of the front, bent region (132) of the keypad surface (122) is a support (150) which runs parallel with the adjacent projection (144) when the keypad surface (122) is folded down, which support (150) bends away laterally from the bent region (132) under the action of an elastic spring force when the keypad surface (122) is folded up, after which the lower end of the said support (150) rests on the adjacent projection (144).

4. Cash register as claimed in claim 1 or 2, in which coupled to the underside of the keypad surface (122) is at least one support lever (160) on which the force of a spring (158) acts in the direction of the casing (112) and which can be pivoted about an axis (162) which is aligned parallel with the pivot axis (136) of the keypad surface (122), and one (164) of whose limbs rests on the cover panel (120) of the casing (112).

5. The cash register as claimed in one of claims 1 to 4, in which, in its folded down position, the keypad surface (122) can be latched to the casing (112) or else locked up.

6. The cash register as claimed in one of claims 1 to 5, having an upper portion (14, 104) which is located behind the keypad surface (41, 122) and in which a receipt printer and/or an operator display device (18) which can be pivoted about a horizontal axis is arranged, in which operator display device (18) the pivot axis (136) of the keypad surface (122) is arranged at such a distance from the upper portion (104)

that, when the keypad surface (122) is folded up, the rear edge (125) of a keypad casing (124) which projects beyond the keypad surface (122) does not collide with the upper portion (104) or with the pivoted out operator display device (18).

7. The cash register as claimed in claim 6, in which the keypad surface (122) is produced from sheet metal and is bent about the pivot axis (136) to form a circular segment-shaped throat (134), the latter being pivotably guided in a gap (134) which is formed between the cover panel (120) of the casing (112) and a rib (140) which is formed onto the upper portion (104).

8. The cash register as claimed in claim 6 or 7, in which the upper portion (14) extends over only part of the width of the casing.

9. The cash register as claimed in claim 8, in which a customer display device (32) whose angle of inclination and height can be adjusted and which can be rotated about a vertical axis is arranged next to the upper portion (14).

10. The cash register as claimed in one of claims 1 to 10, in which a handrest surface (48) is constructed in front of the checkout keypad (46).

11. A cash register comprising:

a housing containing an electronic control system, the housing having an outer, forward wall;

a peripheral unit in the housing and having an interface accessible through an opening in the outer, forward wall of the housing; and a keypad system pivotally mounted on the housing and having a downwardly extending forward flange, the keypad system having a downward pivoted position in which the flange covers the interface of the peripheral and an upward pivoted position in which the flange is in an uncovered position with respect to the interface of the peripheral.

12. The cash register as claimed in claim 11, wherein the keypad system further comprises a first keypad mounted on a keypad support, the flange extending downward from the keypad support.

13. The cash register as claimed in claim 12, further comprising a keypad support connected to the keypad system and having a position which supports the keypad system in the upward pivoted position.

14. The cash register as claimed in claim 13, wherein the keypad system further comprises a second keypad mounted on the keypad support.

* * * * *